(12) United States Patent
Huang

(10) Patent No.: US 10,202,068 B1
(45) Date of Patent: Feb. 12, 2019

(54) HIGH/LOW BEAM SWITCHING DEVICE FOR VEHICLE HEADLIGHT

(71) Applicant: Hsiu-Ming Huang, Tainan (TW)

(72) Inventor: Hsiu-Ming Huang, Tainan (TW)

( * ) Notice: Subject to any disclaimer, the term of this patent is extended or adjusted under 35 U.S.C. 154(b) by 0 days.

(21) Appl. No.: 15/851,558

(22) Filed: Dec. 21, 2017

(51) Int. Cl.
*B60Q 1/00* (2006.01)
*F21V 11/00* (2015.01)
*B60Q 1/14* (2006.01)
*F21S 41/692* (2018.01)
*F21S 41/47* (2018.01)

(52) U.S. Cl.
CPC ............ *B60Q 1/1438* (2013.01); *F21S 41/47* (2018.01); *F21S 41/692* (2018.01)

(58) Field of Classification Search
CPC ...... B60Q 1/1438; F21S 41/47; F21S 41/683; F21S 41/692

USPC ................................. 362/507, 512–513, 539
See application file for complete search history.

(56) References Cited

U.S. PATENT DOCUMENTS

2013/0322101 A1\* 12/2013 Huang ................... F21S 41/686
362/467

\* cited by examiner

*Primary Examiner* — Jason M Han

(57) ABSTRACT

A high/low beam switching device for a vehicle headlight includes a fixing plate and a frame, wherein the frame is fixed to one side of the fixing plate. The fixing plate defines a passage at a top edge thereof and two rods are fixedly provided at the fixing plate. A shielding panel is connected to a shaft of a solenoid device which is located in the frame fixed to the fixing plate. The shielding panel has a main portion and two bars respectively extending from two opposite sides of the main portion, which are configured to be in slight contact with the two rods. The two bars, which extend horizontally, can be stopped by the rods. The high/low beam switching device is easily made and assembled.

3 Claims, 10 Drawing Sheets

US 10,202,068 B1

HIGH/LOW BEAM SWITCHING DEVICE FOR VEHICLE HEADLIGHT

BACKGROUND OF THE INVENTION

1. Fields of the Invention

The present invention relates to a high/low beam switching device, and more particularly, to a high/low beam switching device for a vehicle headlight.

2. Descriptions of Prior Art

Generally, a vehicle headlight is designed to have two types of beams: high beam and low beam. To enable a headlight to switch between high beam and low beam, a conventional high/low beam switching device, as disclosed in FIGS. 1 to 4, may be installed between a base 10 and a cover 101 of the headlight. The conventional high/low beam switching device comprises a fixing plate 11, which is connected to the base 10, defines a passage 110, which is located corresponding to a light source 100. Two pivotal portions 111 extend from two ends of the fixing plate 11, and multiple through holes 112 are defined at the fixing plate 11. A support plate 12 is connected to one side of the fixing plate 11 and defines through holes 120 which are located corresponding to the through holes 112 of the fixing plate 11. A frame 13 and the support plate 12 are fixed to the fixing plate 11 by bolts 14. The frame 13 has a solenoid device 130 received therein, which includes a shaft 131 defining a groove 132. A spring 133 is mounted to the shaft 131. A shielding panel 15 is pivotably connected to the fixing plate 11 and located above the frame 13. The shielding panel 15 has two arms 150 and each arm 150 defines a first pivotal hole 151 and a second pivotal hole 152. A resilient clip 16 has two ends connected to the two second pivotal holes 152 so that the resilient dip 16 is connected to the other side of the fixing plate 11. A T-shaped link member 17 has two ends connected to the two first pivotal holes 151 of the shielding panel 15. The T-shaped link member 17 defines a slot 170 for engagement with the shaft 131 at the groove 132. When the solenoid device 130 is activated, the shaft 131 forces the T-shaped link member 17 to move downward, causing the shielding panel 15 to unblock the passage 111, so that high beam illumination of the headlight can be provided. On the other hand, when the solenoid device 130 is de-activated, the shielding panel 15 can be rotated to block the passage 111, so that high heam illumination of the headlight can be provided. Nevertheless, there are too many parts involved in the conventional switching device of the high/low beam, resulting in a time-consuming manufacturing process and a high cost.

The present invention intends to provide a high/low beam switching device for a vehicle headlight to eliminate the shortcomings mentioned above.

SUMMARY OF THE INVENTION

The present invention relates to a high/low beam switching device for a vehicle headlight, which comprises a fixing plate, a frame and a shielding panel. The fixing plate has two positioning portions respectively formed on two ends thereof, and each positioning portion defines a positioning hole. A passage is defined at a top edge of the fixing plate. Two rods are fixedly provided at the first side of the fixing plate and each rod has an enlarged head formed on a distal end thereof. The frame is fixed to the fixing plate and has a solenoid device received therein. The solenoid device has a shaft retractably extending in a vertical direction. The shielding panel, located on the first side of the fixing plate, has a bridge extending from a lower edge thereof and the bridge is connected to the shaft. The spring is biased between the bridge and a top of the frame. The shielding panel has a main portion and two bars respectively extending from two opposite sides of the main portion. The main portion of the shielding panel can pass between the two rods. The two bars of the shielding panel, which extend horizontally, can be stopped by the rods.

Preferably, the fixing plate defines multiple through holes and the frame defines multiple threaded holes. Multiple bolts extend through the through holes and are threadedly connected to the threaded holes to connect the fixing plate and the frame.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
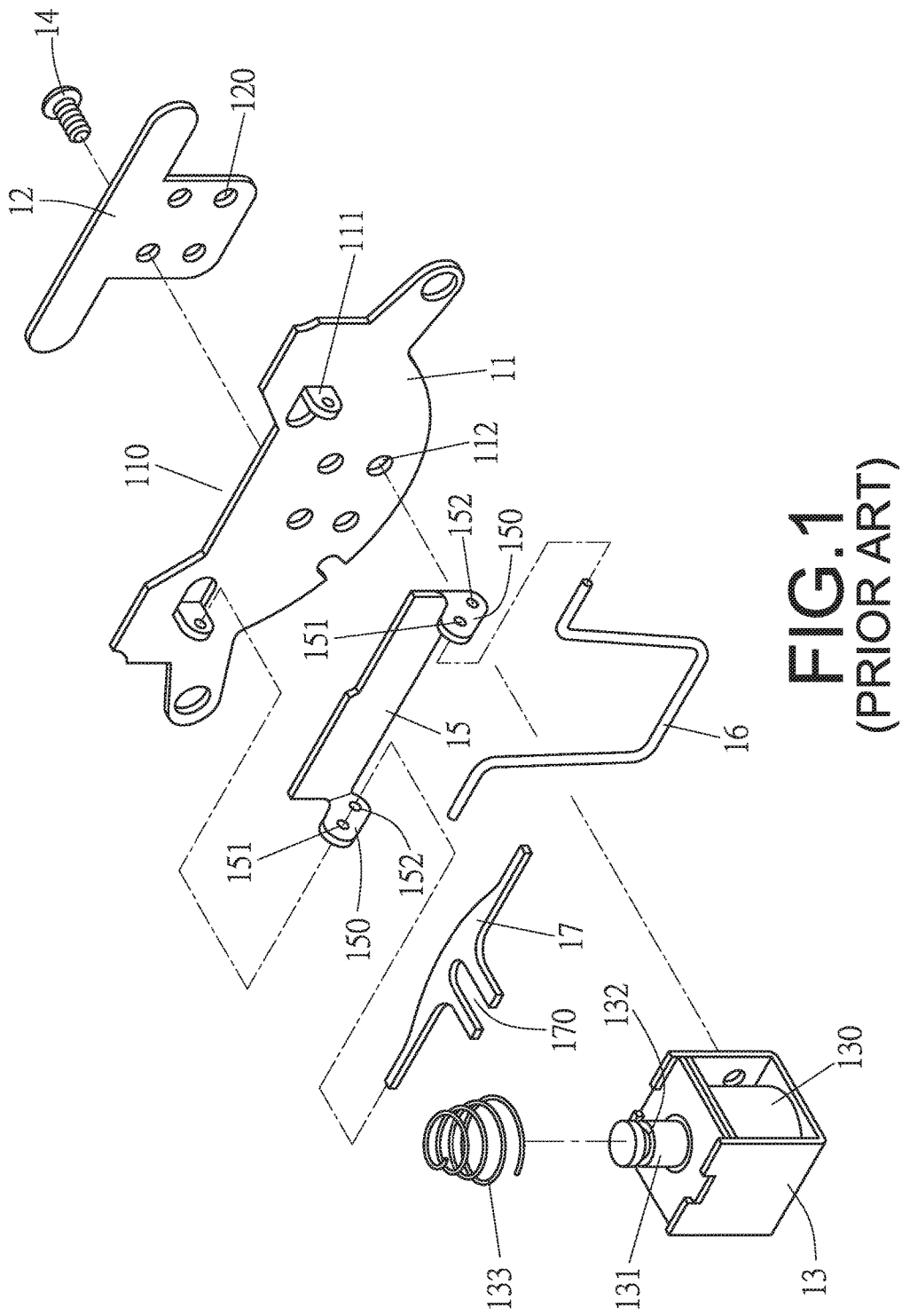
FIG. 1 is an exploded view of a conventional high/low beam switching device for a vehicle headlight.
Figure 2:
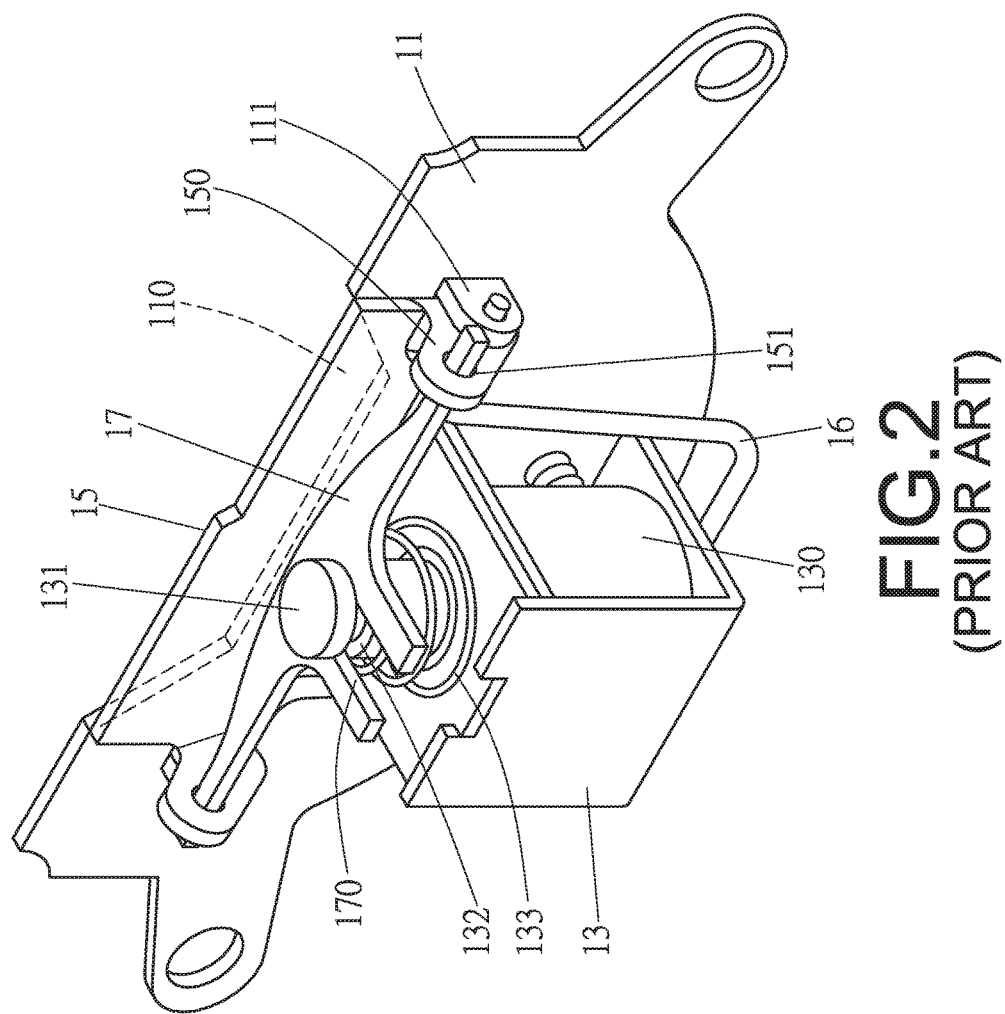
FIG. 2 is a perspective view of the conventional high/low beam switching device.
Figure 3:
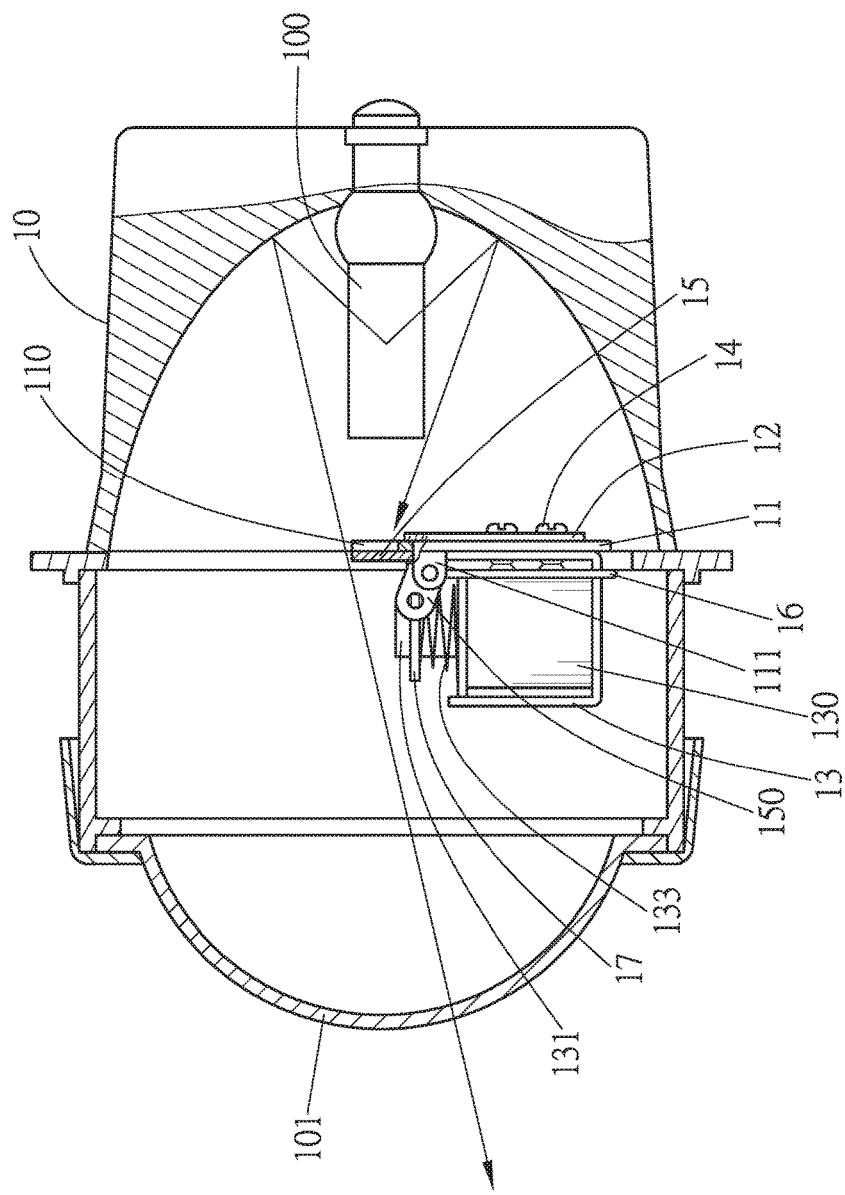
FIG. 3 is a cross sectional view of a headlight with the conventional high/low beam switching device, wherein low beam illumination is provided.
Figure 4:
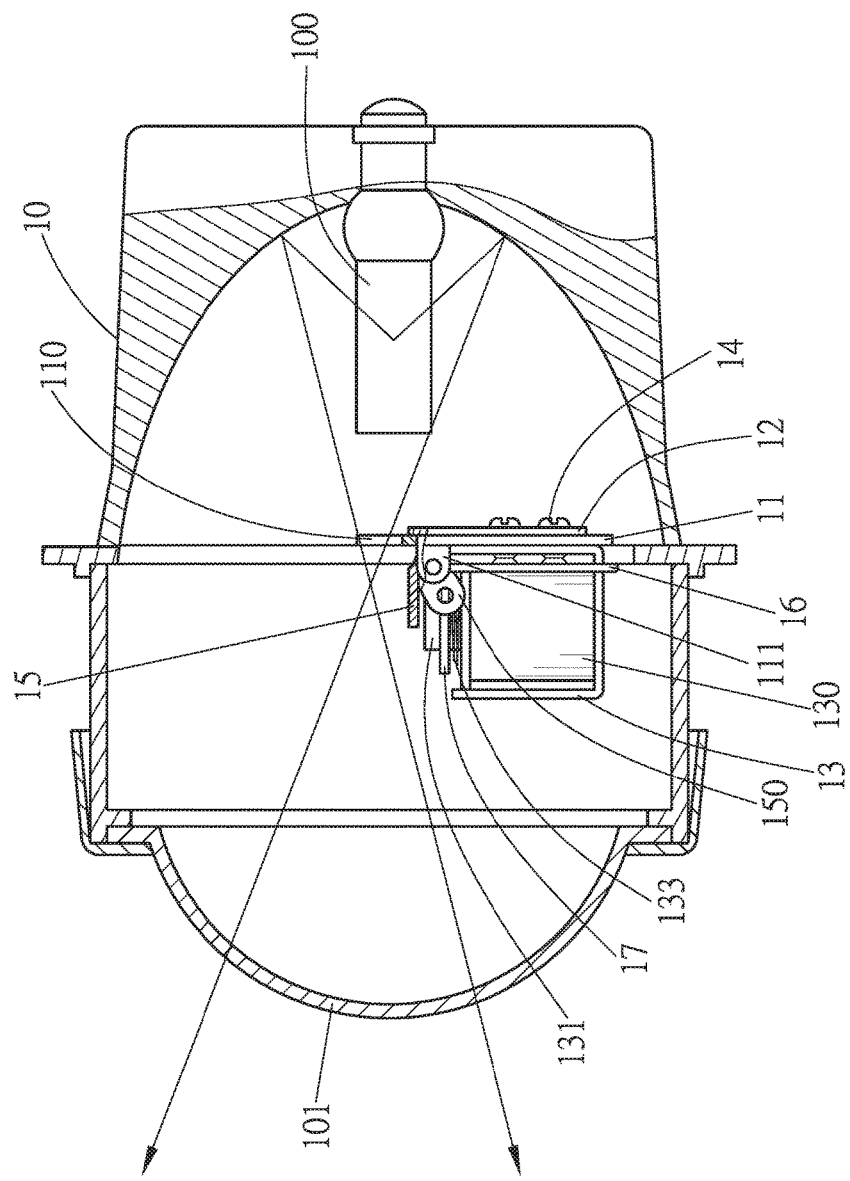
FIG. 4 is a cross sectional view of the headlight with the conventional high/low beam switching device, wherein high beam illumination is provided.
Figure 5:
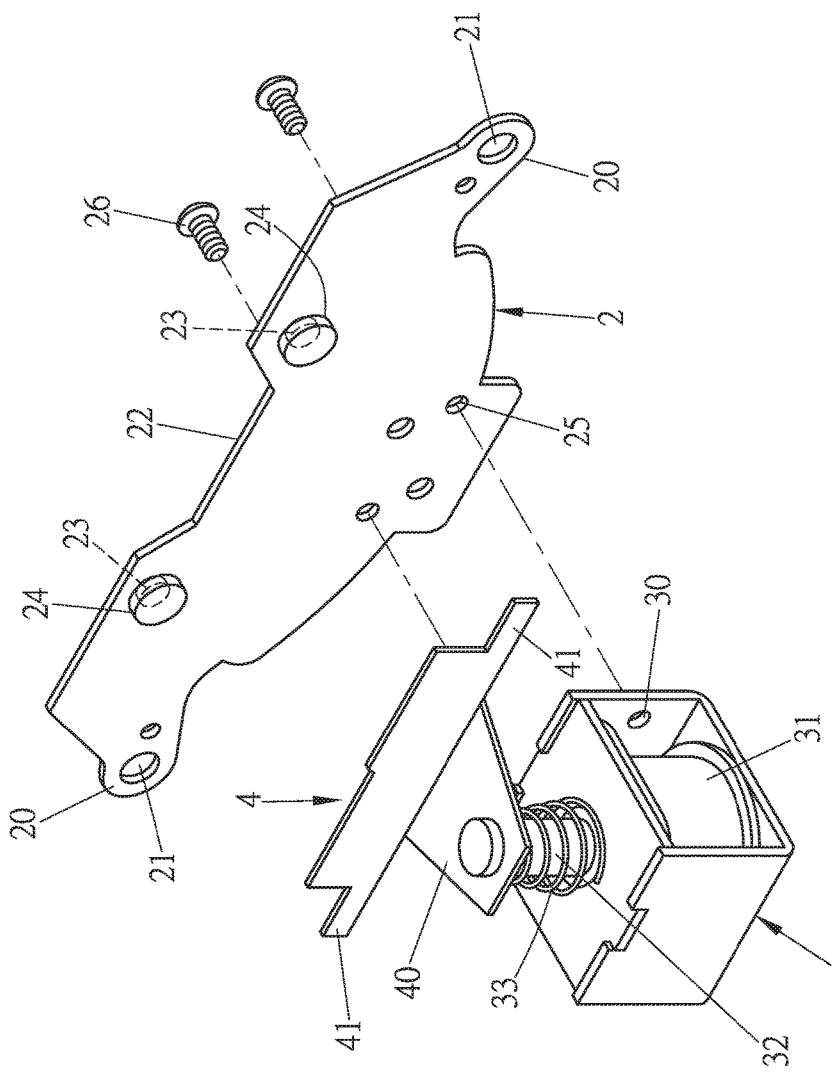
FIG. 5 is an exploded view of a high/low beam switching device for a vehicle headlight according to one embodiment of the present invention.
Figure 6:
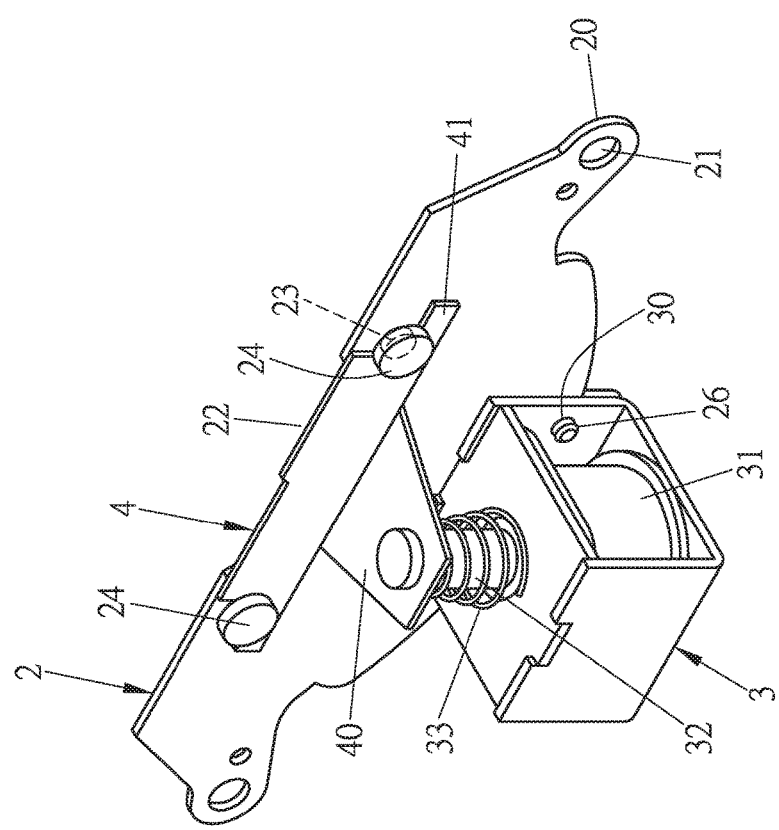
FIG. 6 is a perspective view of the high/low beam switching device of the embodiment.

Referring to FIGS. 5 and 6, a high/low beam switching device for a vehicle headlight of the present invention comprises a fixing plate 2 which includes two positioning portions 20 respectively formed on two ends thereof, and a passage 22 defined at a top edge of the fixing plate 2. Each positioning portion 20 defines a positioning hole 21. Two rods 23 are fixedly provided at the first side of the fixing plate 2 and each rod 23 has an enlarged head 24 formed on a distal end thereof. Multiple through holes 25 are defined at a lower portion of the fixing plate 2.

A frame 3 defines multiple threaded holes 30, and multiple bolts 26 extend through the through holes 25 and are threadedly connected to the threaded holes 30 to connect the fixing plate 2 and the frame 3. The frame 3 has a solenoid device 31 received therein. The solenoid device 31 has a shaft 32 retractably extending in a vertical direction. The shaft 32 extends beyond a top of the frame 3, and a spring 33 is mounted around the shaft 32.

A shielding panel 4, located on the first side of the fixing plate 2, has a bridge 40 extending from the lower edge thereof to be connected to the shaft 32. The spring 33 is biased between the bridge 40 and the top of the frame 3. The shielding panel 4 has a main portion and two bars 41 respectively extending from two opposite sides of the main portion, wherein the two opposite sides of the main portion is in slight contact with the two rods 23 when the shielding panel 4 is moved. The two bars 41, which extend horizontally, can be stopped by the rods 23. As such, a high/low beam switching device for a vehicle headlight can be formed.

Figure 7:
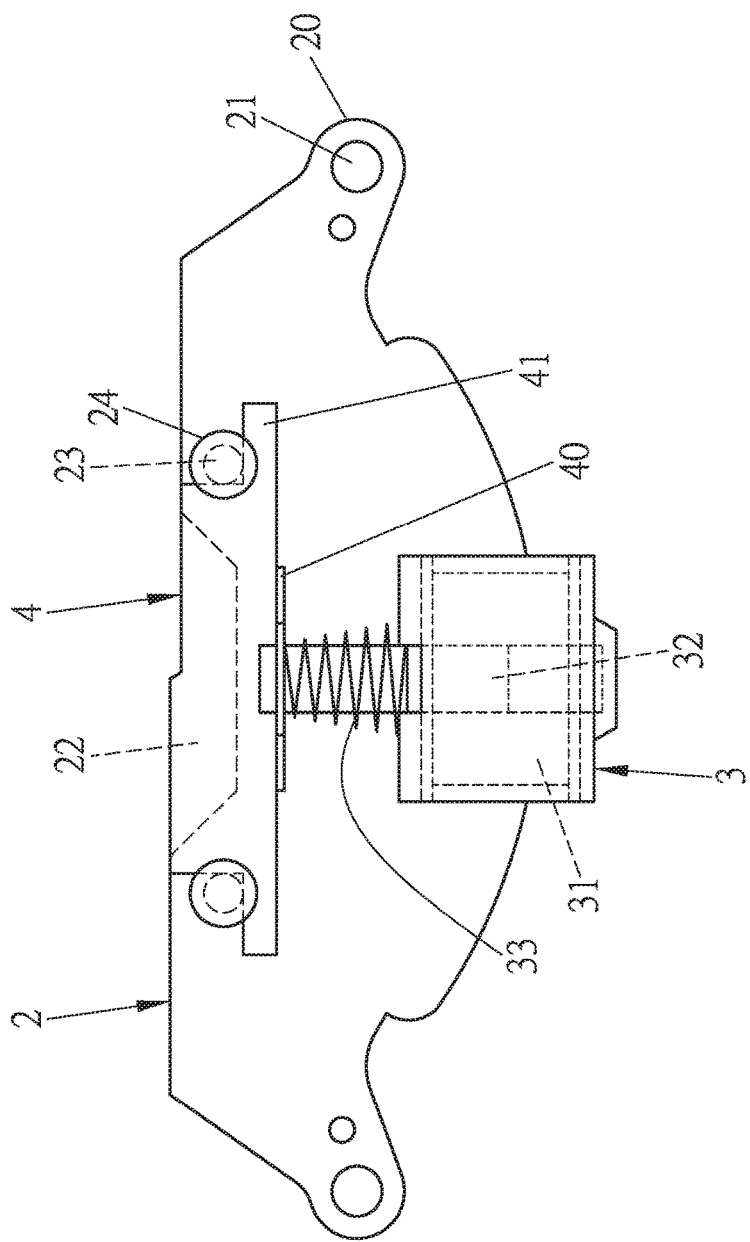
FIG. 7 is a front view of the high/low beam switching device of the embodiment, which is at a state capable of providing low beam illumination.
Figure 8:
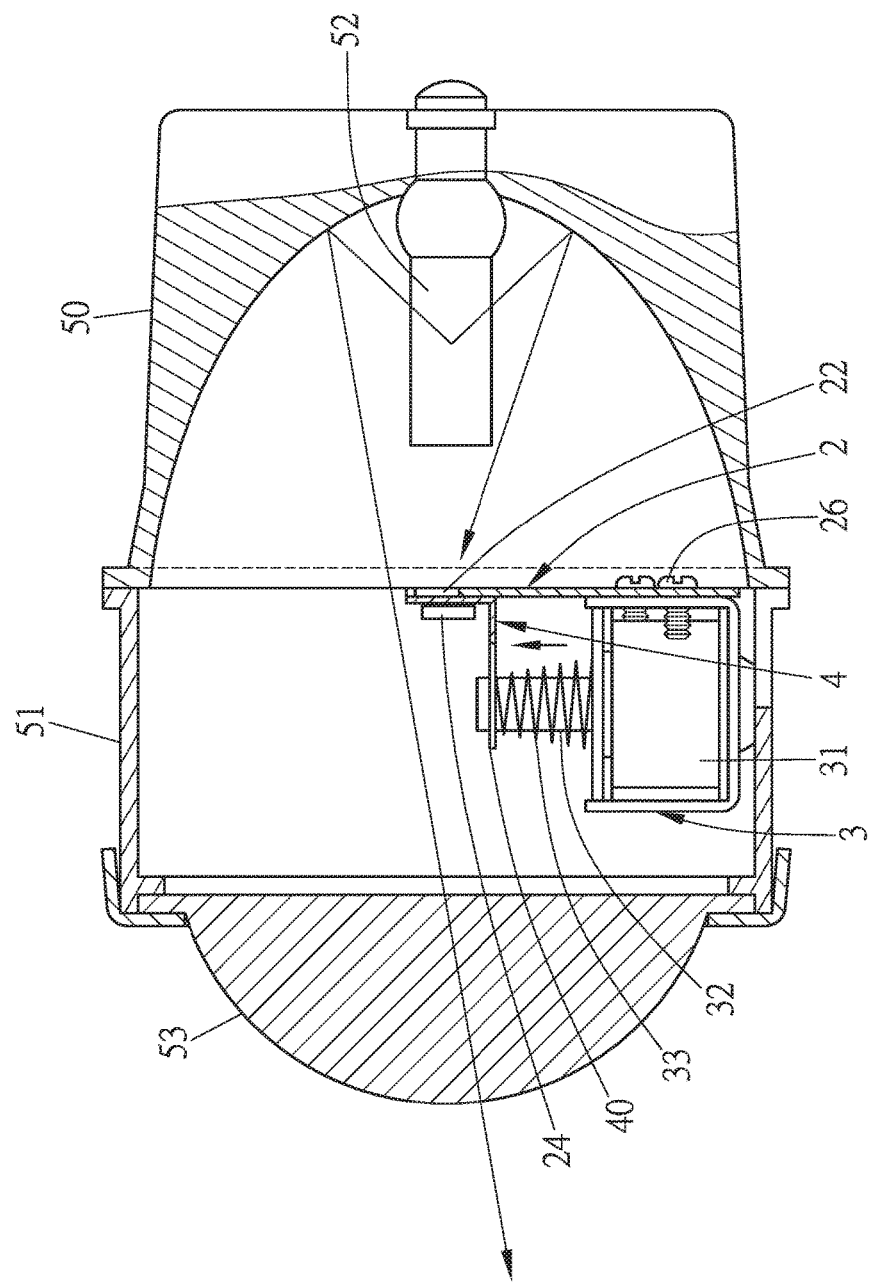
FIG. 8 is a cross sectional view of a headlight with the high/low beam switching device of the embodiment, wherein low beam illumination is provided.

As shown in FIGS. 5 to 8, in assembling the high/low beam switching device, the bridge 40 is connected to the shaft 32 of the frame 3, and the spring 33 is biased between the underside of the bridge 40 and the top of the frame 3 so that the shaft 32 can be pushed up by the spring 33. The shielding panel 4 is located on the first side of the fixing plate 2, wherein the main portion of the shielding panel 4 is located between the two rods 23, and the two bars 41 of the shielding panel 4 are stopped by the rods 23. The bolts 26 extend through the through holes 25 of the fixing plate 2 and are connected to the threaded holes 30 of the frame 3, thus assembling the high/low beam switching device of the present invention as shown in FIGS. 6 and 7. The high/low beam switching device is then installed between the light base 50 and the cover 51 as shown in FIG. 8. The assembly process is easy and quick.

Figure 9:
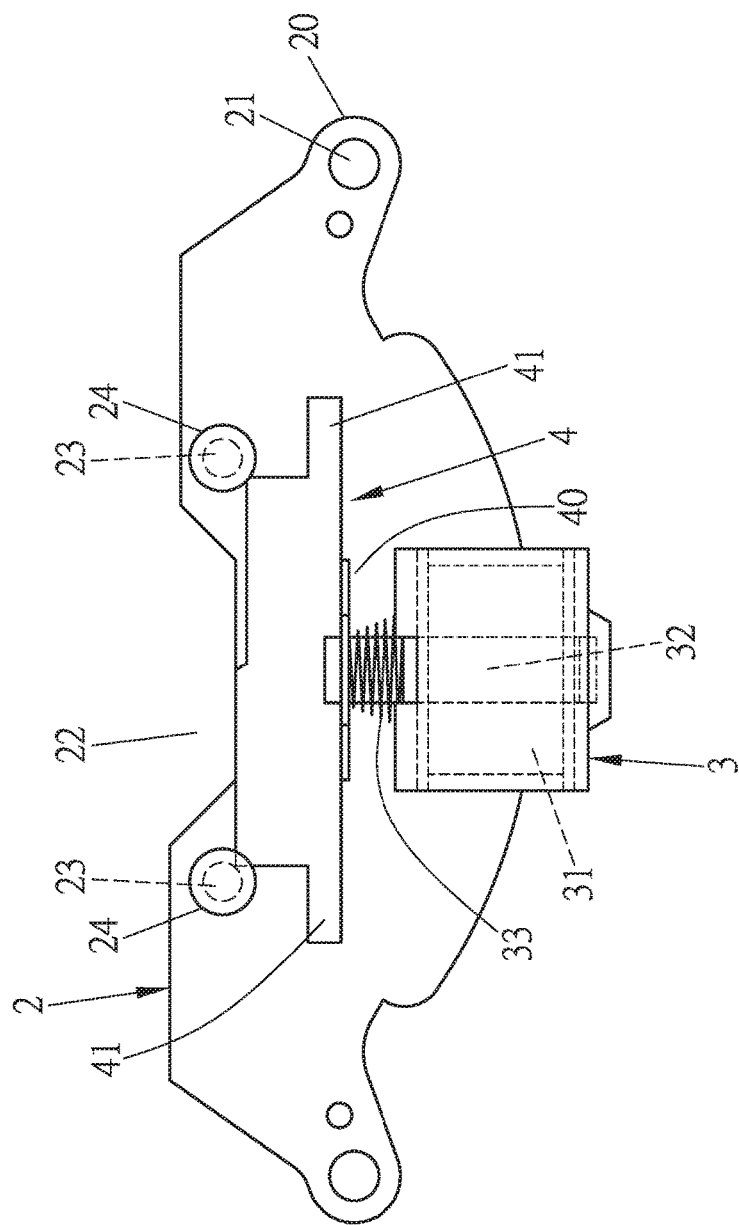
FIG. 9 is a front view of the high/low beam switching device of the embodiment, which is at a state capable of providing high beam illumination.
Figure 10:
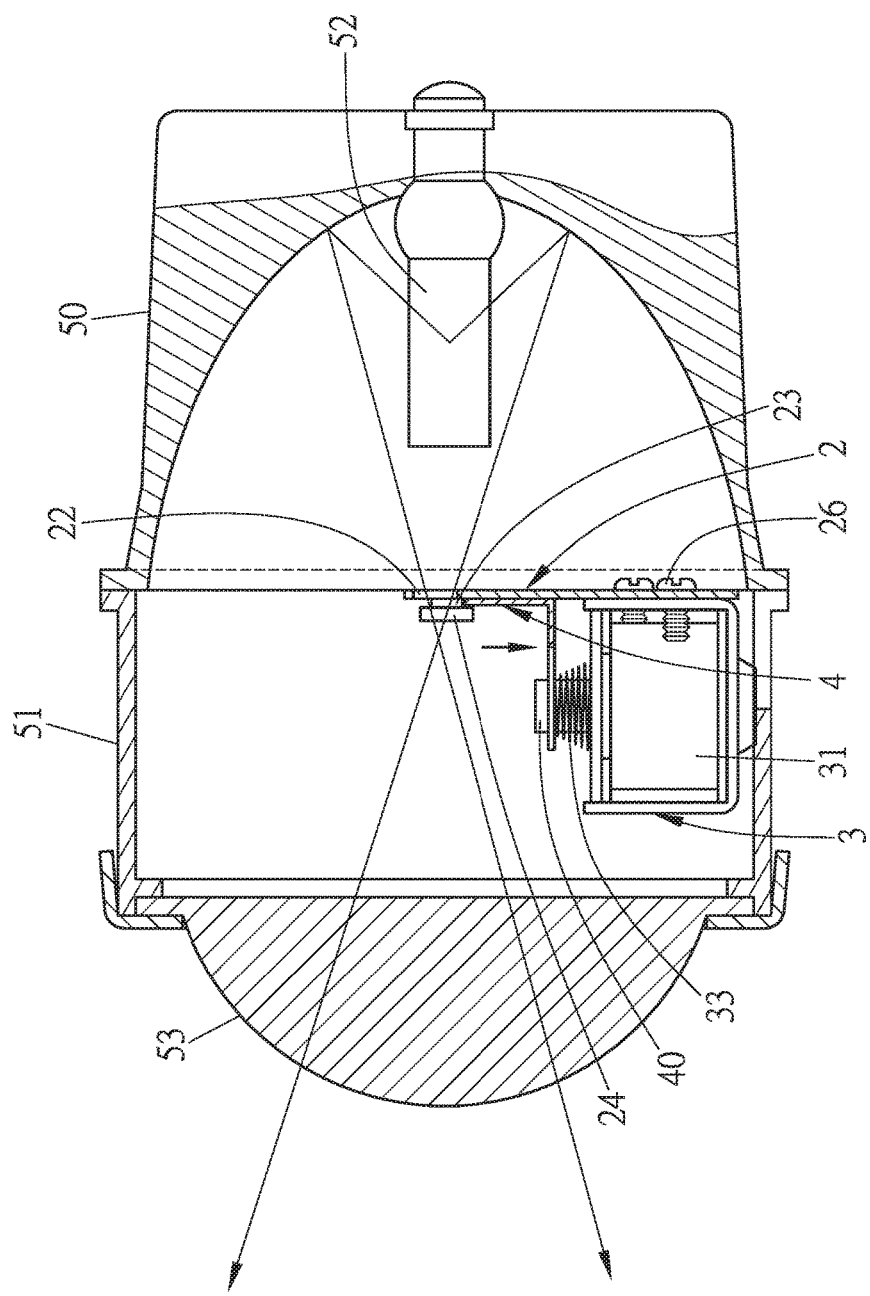
FIG. 10 is a cross sectional view of the headlight with the high/low beam switching device of the embodiment, wherein high beam illumination is provided.

As shown in FIGS. 6 to 10, when the solenoid device 31 is activated, the shaft 32 is moved downward as shown in FIGS. 9 and 10. The bridge 40 of the shielding panel 4 is moved downward together with the shaft 32 so that the shielding panel 4 is moved downward and linearly such that the passage 22 is not blocked by the shielding panel 4. The light beams generated from the light source 52 can be reflected to pass through the passage 22 to provide high beam illumination. When the solenoid device 31 is de-activated, the shaft 32 can be pushed up by the spring 33 so that the bridge 40 of the shielding panel 4 is moved upward together with the shaft 32 so that the shielding panel 40 is moved upward and linearly to block the passage 22 as shown in FIGS. 7 and 8. The two bars 41 of the shielding panel 4 are stopped by the rods 23 on the fixing plate 2. Therefore, the headlight provides low beam illumination.

The present invention uses fewer components and can be easily assembled. The manufacturing cost and assembling time are reduced when compared with conventional high/low beam switching devices.

While we have shown and described the embodiment in accordance with the present invention, it should be clear to those skilled in the art that further embodiments may be made without departing from the scope of the present invention.

What is claimed is:

1. A high/low beam switching device for a vehicle headlight, comprising:
    a fixing plate having two positioning portions respectively formed on two ends thereof, each positioning portion defining a positioning hole, a passage defined at a top edge of the fixing plate, two rods fixedly provided at a first side of the fixing plate and separated by the passage;
    a frame fixed to the fixing plate and having a solenoid device received therein, the solenoid device having a shaft extending in a vertical direction, beyond a top of the frame; and
    a shielding panel located on the first side of the fixing plate and connected to the shaft by a bridge, a spring mounted around the shaft and biased between the bridge and the top of the frame, the shielding panel having a main portion and two bars respectively extending from two opposite sides of the main portion, the shielding panel being configured such that the two opposite sides of the main portion is in slight contact with the two rods when the shielding panel is moved, whereas the two bars extend horizontally to be stopped by the two rods; whereby the shielding panel is operated to move along a linear path such that, when the solenoid device is de-activated, the shielding panel is forced by the spring and guided by the two rods to have the main portion thereof pass between the two rods, and the two bars are stopped by the two rods, thereby blocking the passage of the fixing plate; when the solenoid device is activated, the shielding panel is moved downwardly to be clear of the two rods, thereby unblocking the passage of the fixing plate.

2. The high/low beam switching device for a vehicle headlight as claimed in claim 1, wherein the fixing plate defines multiple through holes and the frame defines multiple threaded holes, and multiple bolts extend through the through holes and are threadedly connected to the threaded holes to connect the fixing plate and the frame.

3. The high/low beam switching device for a vehicle headlight as claimed in claim 1, wherein each rod has an enlarged head formed at a distal end thereof to assist the shielding panel being moved along the linear path.

* * * * *